(12) United States Patent
Koide et al.

(10) Patent No.: US 11,988,911 B2
(45) Date of Patent: May 21, 2024

(54) DISPLAY DEVICE

(71) Applicant: Japan Display Inc., Tokyo (JP)

(72) Inventors: Gen Koide, Tokyo (JP); Shimpei Noshita, Tokyo (JP); Junichi Kitamura, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/169,391

(22) Filed: Feb. 15, 2023

(65) Prior Publication Data

US 2023/0194916 A1 Jun. 22, 2023

Related U.S. Application Data

(63) Continuation of application No. 17/365,591, filed on Jul. 1, 2021, now Pat. No. 11,609,445, which is a (Continued)

(30) Foreign Application Priority Data

Mar. 7, 2017 (JP) .................................. 2017-043028

(51) Int. Cl.
*G09G 3/30* (2006.01)
*G02F 1/133* (2006.01)
(Continued)

(52) U.S. Cl.
CPC .... *G02F 1/13306* (2013.01); *G02F 1/133514* (2013.01); *G02F 1/1337* (2013.01);
(Continued)

(58) Field of Classification Search
CPC ........... G02F 1/13306; G02F 1/133514; G02F 1/1337; G02F 1/1343; G02F 1/13454;
(Continued)

(56) References Cited

U.S. PATENT DOCUMENTS

| | | | |
|---|---|---|---|
| 2009/0102758 A1* | 4/2009 | Anzai | G09G 3/3266 345/76 |
| 2010/0141570 A1* | 6/2010 | Horiuchi | G11C 19/28 345/100 |

(Continued)

FOREIGN PATENT DOCUMENTS

CN 106448535 A 2/2017

OTHER PUBLICATIONS

Combined Chinese Office Action and Search Report dated Nov. 3, 2020 in Patent Application No. 201810186982.6 (submitting English machine translation only), citing FD No. 1 therein, 13 pages.

*Primary Examiner* — Abdul-Samad A Adediran
(74) *Attorney, Agent, or Firm* — Maier & Maier, PLLC

(57) ABSTRACT

In one embodiment, a display device includes a display area, a peripheral area, scanning lines, signal lines, a first driver in the peripheral area, and a second driver in the peripheral area. The display area has an arc-shaped corner. The first driver includes first and second buffers configured to apply voltage to the scanning lines, a first shift register unit configured to control the first buffer unit, and a second shift register unit configured to control the second buffer unit. At the corner, extension directions of the first buffer unit and the first shift register unit are equal to each other. Extension directions of the second buffer unit and the second shift register unit are different from each other.

8 Claims, 11 Drawing Sheets

Related U.S. Application Data continuation of application No. 16/879,257, filed on May 20, 2020, now Pat. No. 11,086,153, which is a continuation of application No. 15/908,940, filed on Mar. 1, 2018, now Pat. No. 10,698,239.

(51) Int. Cl.
| | |
|---|---|
| *G02F 1/1335* | (2006.01) |
| *G02F 1/1337* | (2006.01) |
| *G02F 1/1343* | (2006.01) |
| *G02F 1/1345* | (2006.01) |
| *G09G 3/3225* | (2016.01) |
| *G09G 3/3266* | (2016.01) |
| *G09G 3/3275* | (2016.01) |
| *G02F 1/1362* | (2006.01) |
| *G09G 3/3233* | (2016.01) |

(52) U.S. Cl.
CPC ........ *G02F 1/1343* (2013.01); *G02F 1/13454* (2013.01); *G09G 3/3225* (2013.01); *G09G 3/3266* (2013.01); *G09G 3/3275* (2013.01); *G02F 1/136286* (2013.01); *G02F 2201/56* (2013.01); *G09G 3/3233* (2013.01)

(58) Field of Classification Search
CPC .......... G02F 1/136286; G02F 2201/56; G09G 3/3225; G09G 3/3266; G09G 3/3275; G09G 3/3233
USPC ...................................... 345/76, 100; 349/33
See application file for complete search history.

(56) References Cited

U.S. PATENT DOCUMENTS

| | | | | |
|---|---|---|---|---|
| 2015/0355487 | A1* | 12/2015 | Emmert | .............. G02F 1/13306 349/33 |
| 2016/0247478 | A1* | 8/2016 | Ishige | ................... G02F 1/1345 |
| 2017/0123285 | A1 | 5/2017 | Suzuki et al. | |

* cited by examiner

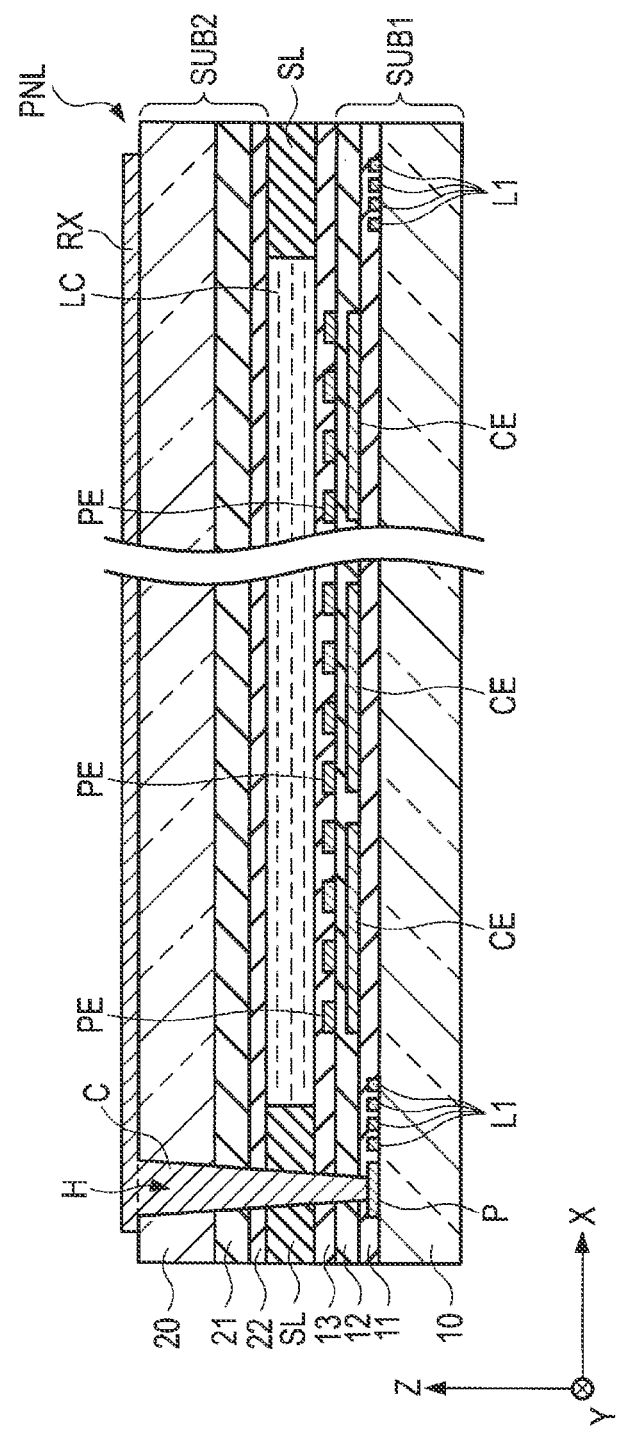
F I G. 3

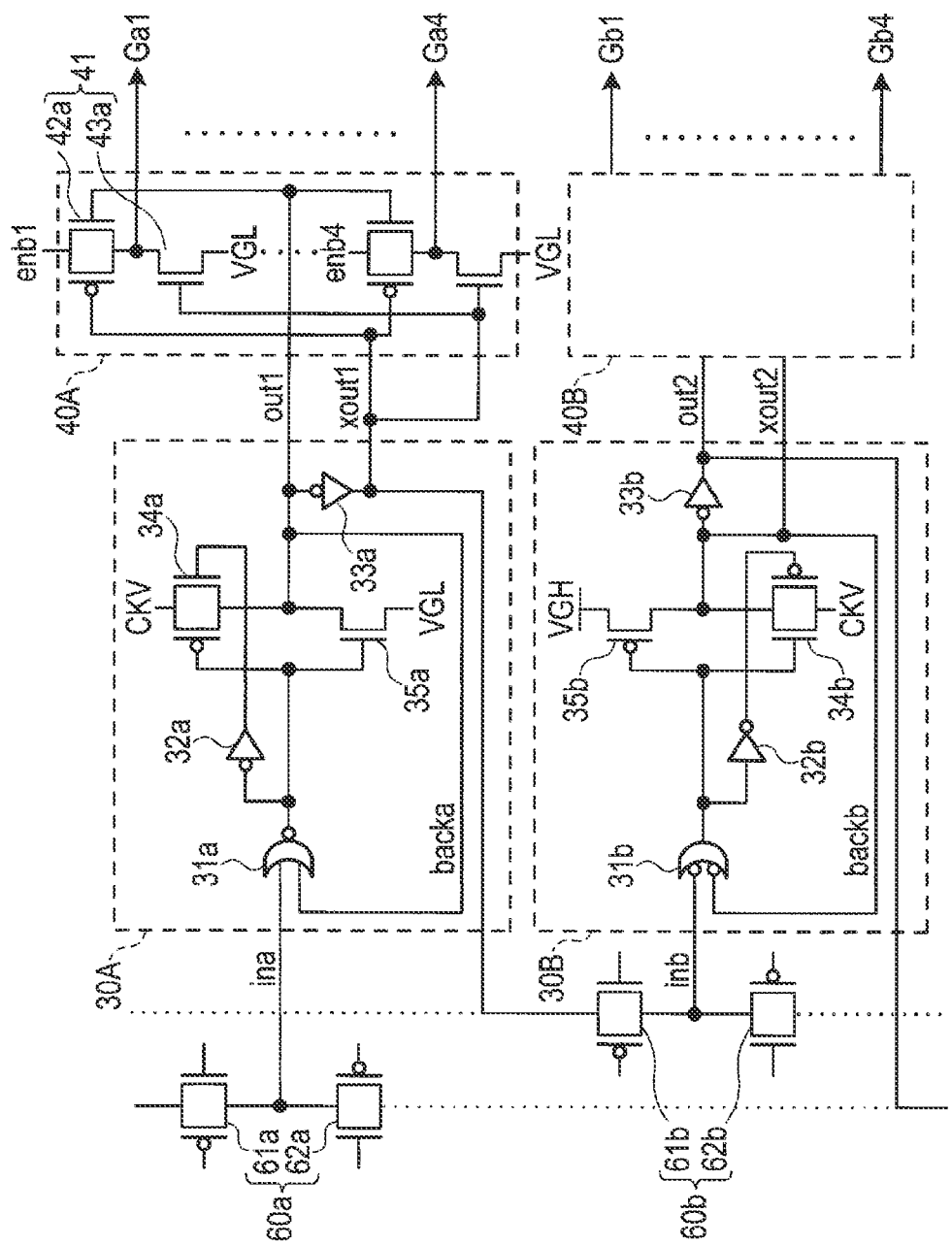
F I G. 5

DISPLAY DEVICE

CROSS-REFERENCE TO RELATED APPLICATIONS

This application is a continuation of U.S. application Ser. No. 17/365,591, filed on Jul. 1, 2021, which is a continuation of U.S. application Ser. No. 16/879,257 filed on May 20, 2020, which is a continuation of U.S. application Ser. No. 15/908,940 filed Mar. 1, 2018, and which is based upon and claims the benefit of priority from Japanese Patent Application No. 2017-043028, filed Mar. 7, 2017, the entire contents of each of which are incorporated herein by reference.

FIELD

Embodiments described herein relate generally to a display device.

BACKGROUND

A display device such as a liquid crystal display device or an organic electroluminescent display device has a display area in which pixels are arranged and a peripheral area which surrounds the display area. Peripheral circuits which drive the pixels are arranged in the peripheral area.

Recently, various techniques for narrowing the frame of the display device have been considered. To narrow the frame of the display device, the area of the peripheral area needs to be reduced by arranging the peripheral circuits more efficiently.

BRIEF DESCRIPTION OF THE DRAWINGS

FIG. 3 is a schematic sectional view of a display panel taken along line III-III of FIG. 2.

FIG. 5 is a diagram showing a specific example of the equivalent circuit applicable to a scanning line driver.

DETAILED DESCRIPTION

Figure 1:
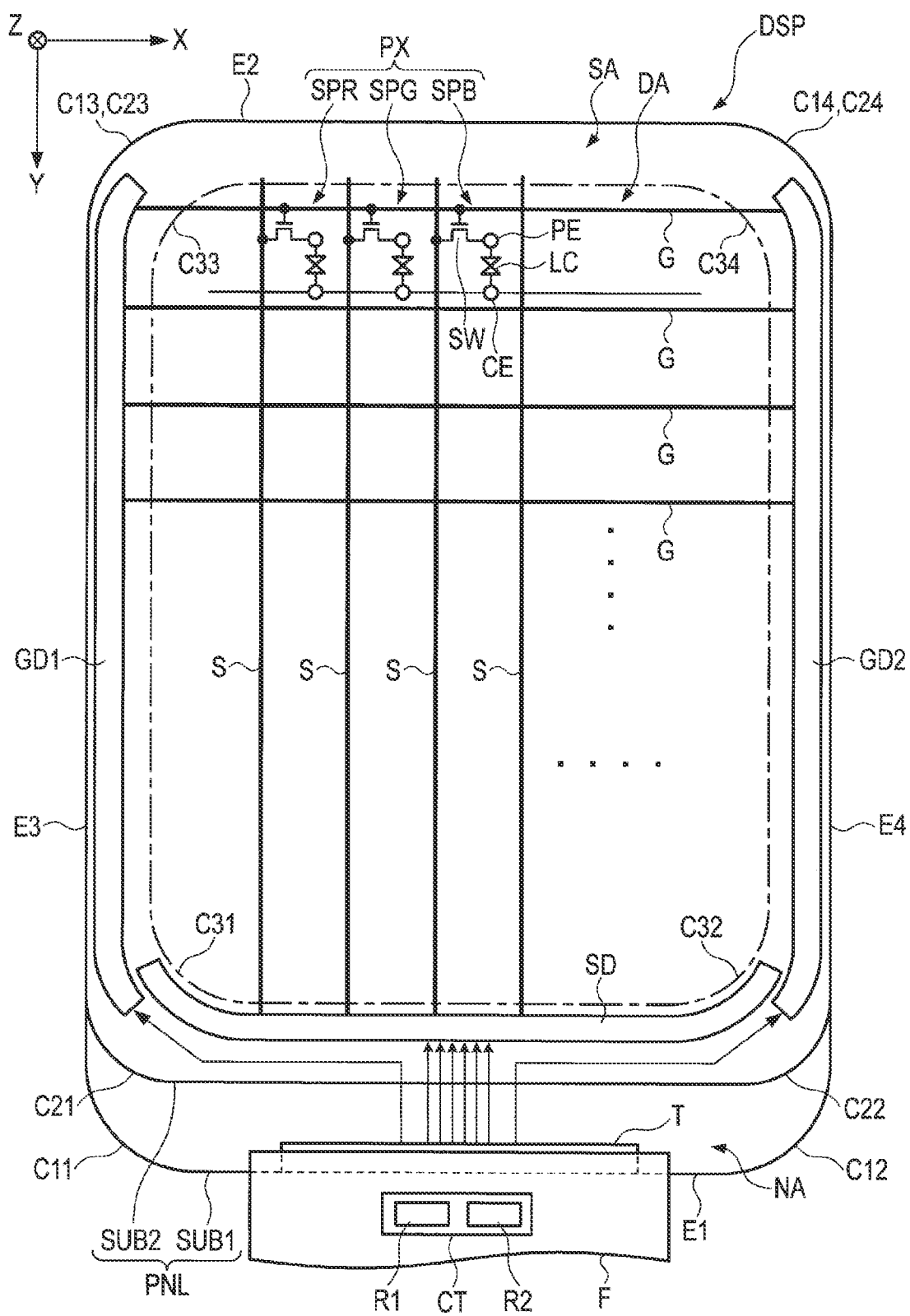
FIG. 1 is a schematic plan view of an example of the structure of a display device according to one embodiment.

In general, according to one embodiment, a display device includes a display area including a plurality of pixels, a peripheral area around the display area, a plurality of scanning lines extending in a first direction in the display area, a plurality of signal lines extending in a second direction crossing the first direction in the display area, a first driver arranged in the peripheral area and connected to the scanning lines, and a second driver arranged in the peripheral area and connected to the signal lines. The display area has an arc-shaped corner. The first driver includes a first buffer unit and a second buffer unit which are configured to apply voltage to the corresponding scanning lines, a first shift register unit configured to control the first buffer unit, and a second shift register unit configured to control the second buffer unit. At the corner, an extension direction of the first buffer unit and an extension direction of the first shift register unit are equal to each other. An extension direction of the second buffer unit and an extension direction of the second shift register unit are different from each other.

According to this structure, a display device having a narrow frame can be obtained.

An embodiment will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated in the drawings schematically, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

In the embodiment, a liquid crystal display device having a touch detection function will be described as an example of the display device. This liquid crystal display device can be used in various devices such as a smartphone, a tablet computer, a mobile phone, a notebook computer, a vehicle-mounted device and a game console. The main structure disclosed in the embodiment is applicable to a self-luminous display device such as an organic electroluminescent display device, an electronic paper-type display device including an electrophoretic element, etc., a display device adopting micro-electromechanical systems (MEMS), a display device adopting electrochromism, etc. Further, the structure related to image display disclosed in the embodiment is also applicable to a display device which does not have a touch detection function.

FIG. 1 is a schematic plan view of an example of the structure of a display device DSP according to the present embodiment. In the drawing, a first direction X and a second direction Y orthogonally cross each other, and a third direction Z crosses the first direction X and the second direction Y. The first direction X, the second direction Y and the third direction Z are assumed to orthogonally cross each other, for example, but may cross each other at an angle other than an angle of 90 degrees. In the description, the direction of the pointing end of an arrow showing the third direction Z is referred to as upward (or simply above), and the direction opposite to the pointing end of the arrow is referred to as downward (or simply below).

The display device DSP includes a display panel PNL, a wiring board F and a controller CT. The display panel PNL includes a first substrate SUB1, a second substrate SUB2 and a liquid crystal layer LC interposed between the first substrate SUB1 and the second substrate SUB2 (see FIG. 3 for details). Further, the display panel PNL has a display area DA in which an image is displayed, and a frame-like peripheral area SA which surrounds the display area DA.

The display panel PNL has a first edge E1, a second edge E2 located on the other side of the display area DA from the first edge E1, a third edge E3 and a fourth edge E4 located on the other side of the display area DA from the third edge E3. In the example shown in FIG. 1, the edges E1 and E2 are parallel to the first direction X, and the edges E3 and E4 are parallel to the second direction Y. At the edges E2, E3 and E4, the edges of the first substrate SUB1 and the edges of the second substrate SUB2 are aligned with each other. The first edge E1 corresponds to the edge of the first substrate SUB1. The edge of the second substrate SUB2 on the first edge E1 side is located on the display area DA side from the edge of the first substrate SUB1. That is, the display panel PNL has an unopposed area NA (or a terminal area) in which the first substrate SUB1 is not opposed to the second substrate SUB2 between the first edge E1 and the display area DA.

The first substrate SUB1 has a corner C11 between the edge E1 and the edge E3, a corner C12 between the edge E1 and the edge E4, a corner C13 between the edge E2 and the edge E3 and a corner C14 between the edge E2 and edge E4. The second substrate SUB2 has a corner C21 near the corner C11, a corner C22 near the corner C12, a corner C23 near the corner C13 and a corner C24 near the corner C14. The display area DA has a corner C31 near the corner C11, a corner C32 near the corner C12, a corner C33 near the corner C13 and a corner C34 near the corner C14.

In the example shown in FIG. 1, all of the corners C11 to C14 of the first substrate SUB1, the corners C21 to C24 of the second substrate SUB2 and the corners C31 to C34 of the display area DA have the shape of an arc. For example, the corners C11 to C14 of the first substrate SUB1 and the corners C23 and C24 of the second substrate SUB2 have a first radius of curvature, the corners C21 and C22 of the second substrate SUB2 have a second radius of curvature, and the corners C31 to C34 of the display area DA have a third radius of curvature. The first radius of curvature, the second radius of curvature and the third radius of curvature differ from each other, and are assumed to satisfy the first radius of curvature>the second radius of curvature>the third radius of curvature, for example. The relationships among the corners C11 to C14, C21 to C24 and C31 to C34 are not limited to those described above. Further, at least one of the corners C11 to C14, C21 to C24 and C31 to C34 may not have the shape of an arc but may be square.

The display panel PNL includes a plurality of scanning lines G and a plurality of signal lines S in the display area DA. The scanning lines G extend in the first direction X and are arranged in the second direction Y at intervals. The signal lines S extend in the second direction Y and are arranged in the first direction X at intervals.

The display area DA includes a plurality of pixels PX arranged in the first direction X and the second direction Y. Each pixel PX includes subpixels SP which display different colors from each other. For example, the pixel PX includes a subpixel SPR corresponding to red, a subpixel SPG corresponding to green and a blue subpixel SPB corresponding to blue. The pixel PX does not necessarily have this structure and may further include a subpixel which displays white, for example, or may include a plurality of subpixels corresponding to the same color. In the description, a subpixel may also be referred to simply as a pixel.

Each subpixel SP includes a switching element SW, a pixel electrode PE and a common electrode CE. The common electrode CE is formed over several subpixels SP, for example. The switching element SW is electrically connected to the scanning line G, the signal line S and the pixel electrode PE.

The display panel PNL includes scanning line drivers GD1 and GD2 (first drivers) connected to the scanning lines G, and a signal line driver SD (second driver) connected to the signal lines S. The scanning line driver GD1 is arranged between the display area DA and the third edge E3, and the scanning line driver GD2 is arranged between the display area DA and the fourth edge E4. The signal line driver SD is arranged between the display area DA and the unopposed area NA. One of the scanning line drivers GD1 and GD2 may be omitted.

In the example shown in FIG. 1, the scanning line driver GD1 is curved in an arc shape similarly to the corners C31 and C33 near the corners C31 and C33. That is, the scanning line driver GD1 includes a portion extending parallel to the second direction Y (a middle portion in the second direction Y), and portions extending in directions crossing the first direction X and the second direction Y (end portions in the second direction Y).

Further, the scanning line driver GD2 is curved in an arc shape similarly to the corners C32 and C34 near the corners C32 and C34. That is, the scanning line driver GD2 includes a portion extending parallel to the second direction Y (a middle portion in the second direction Y), and portions extending in directions crossing the first direction X and the second direction Y (end portions in the second direction Y).

Still further, the signal line driver SD is curved in an arc shape similarly to the corners C31 and C32 near the corners C31 and C32. That is, the signal line driver SD includes a portion extending parallel to the first direction X (a middle portion in the first direction X), and portions extending in directions crossing the first direction X and the second direction Y (end portions in the first direction X).

An end of the signal line driver SD near the corner C31 is located between the scanning line driver GD1 and the display area DA. An end of the signal line driver SD near the corner C32 is located between the scanning line driver GD2 and the display area DA.

The scanning line drivers GD1 and GD2 supply scanning signals to the scanning lines G. The signal line driver SD supplies video signals to the signal lines S. If a scanning signal is supplied to the scanning line G corresponding to a switching element SW and a video signal is supplied to the signal line S connected to this switching element SW, the switching element SW is set to an on state by the scanning signal and a voltage corresponding to the video signal is applied to the pixel electrode PE. At this time, an electric field is generated between the pixel electrode PE and the common electrode CE and the alignment of liquid crystal molecules of the liquid crystal layer LC is changed from an initial alignment state. Through these operations, an image is displayed in the display area DA.

A connection terminal T is provided along the first edge E1 in the unopposed area NA, and the wiring board F is connected to the connection terminal T. In the example shown in FIG. 1, the controller CT is mounted on the wiring board F. The controller CT includes a display driver R1 which controls the scanning line drivers GD1 and GD2 and the signal line driver SD, and a detection driver R2 for touch detection. The display driver R1 and the detection driver R2 are not necessarily mounted in these manners and may be mounted on the first substrate SUB1, for example. Further, the display driver R1 and the detection driver R2 may be mounted on different members, respectively.

Figure 2:
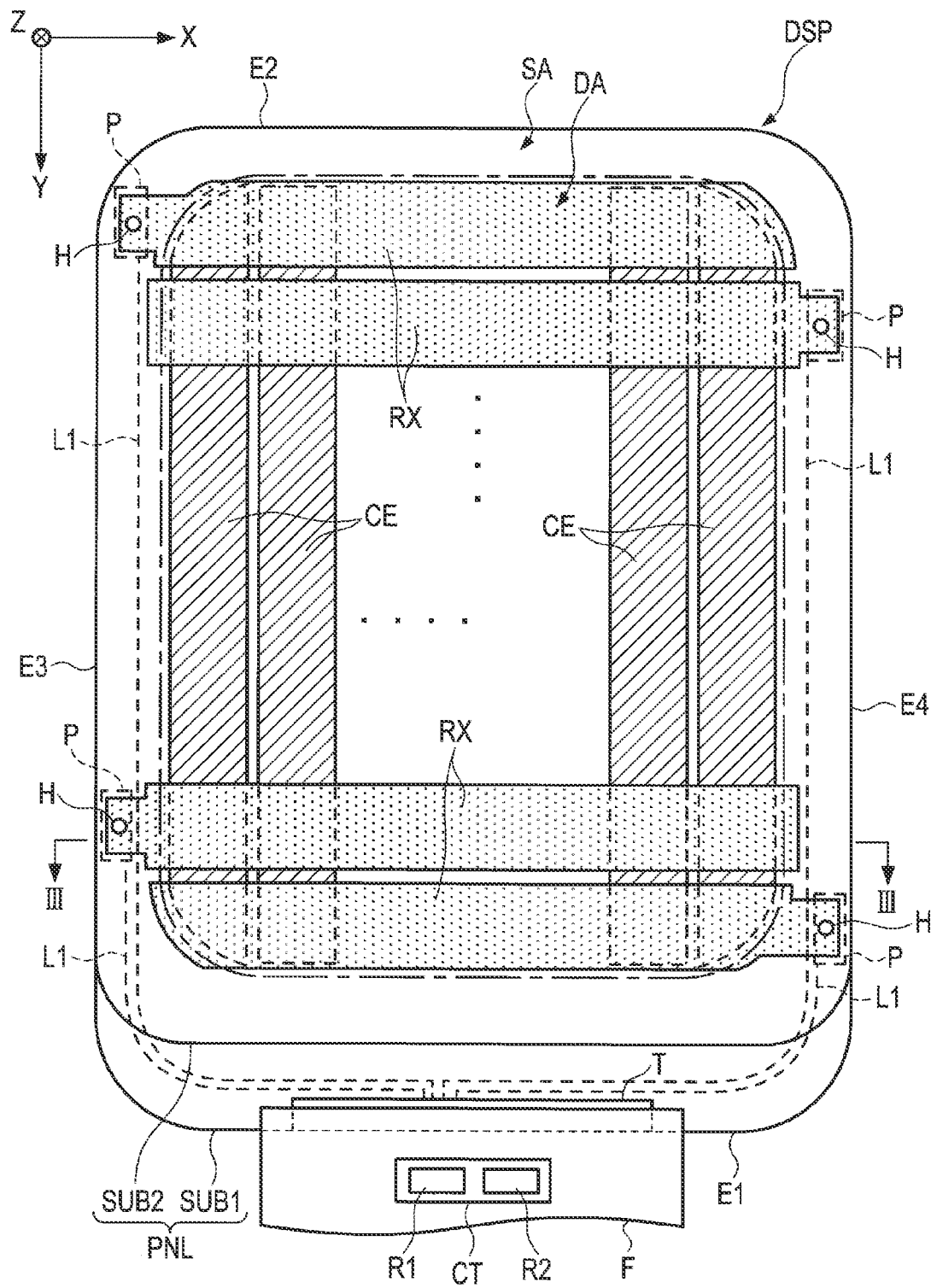
FIG. 2 is a schematic plan view of an example of the structure related to a touch detection function of the display device.

FIG. 2 is a plan view of the display device DSP schematically showing an example of the structure related to the touch detection function. The display device DSP includes a plurality of detection electrodes RX. The detection electrodes RX extend in the first direction X and are arranged in the second direction Y in the display area DA. Further, in the example shown in FIG. 2, the common electrodes CE are arranged in the display area DA. The common electrodes CE extend in the second direction Y and are arranged in the first direction X.

The common electrodes CE function not only as electrodes for image display but also as driving electrodes for detecting an object approaching the display area DA in cooperation with the detection electrodes RX. The present embodiment will be described based on the assumption that the common electrodes CE are arranged on the first substrate SUB1 and the detection electrodes RX are arranged on the second substrate SUB2. However, the display device DSP can also adopt such a structure where driving electrodes are provided separately from the common electrodes CE. Further, the detection electrodes RX and the common electrodes CE (or the driving electrodes) may be arranged in various other manners. For example, the common electrodes CE (or the driving electrodes) may be provided on the second substrate SUB2, or the detection electrodes RX and the driving electrodes which are provided separately from the common electrodes CE may be provided on a transparent base arranged on the display surface of the display panel PNL.

In the example shown in FIG. 2, each detection electrode RX is electrically connected to a pad P arranged in the peripheral area SA via a connection hole H. The pad P is electrically connected to the connection terminal T via a lead line L1 arranged in the peripheral area SA. As illustrated in the drawing, the odd-numbered detection electrodes RX from the second edge E2 are connected to the pads P arranged between the third edge E3 and the display area DA, and the even-numbered detection electrodes RX from the second edge E2 are connected to the pads P arranged between the fourth edge E4 and the display area DA.

FIG. 3 is a schematic sectional view of the display panel PNL taken along line III-III of FIG. 2. The first substrate SUB1 includes a first base 10 such as a glass substrate or a resin substrate, a first insulating layer 11, a second insulating layer 12, a first alignment film 13, and the common electrodes CE and the pixel electrodes PE. The first substrate SUB1 also includes the scanning lines G, the signal lines S, the switching elements SW, etc., but illustrations thereof are omitted in FIG. 3.

The pads P and the lead lines L1 are arranged on the first base 10. An insulating layer may be interposed between the pads P and the lead lines L1, and the first base 10. The first insulating layer 11 covers the pads P and the lead lines L1. The common electrodes CE are arranged on the first insulating layer 11. The second insulating layer 12 covers the common electrodes CE and the first insulating layer 11. The pixel electrodes PE are arranged on the second insulating layer 12 and are opposed to the common electrodes CE via the second insulating layer 12. The first alignment film 13 covers the pixel electrodes PE and the second insulating layer 12.

The second substrate SUB2 includes a second base 20 such as a glass substrate or a resin substrate, a color filter layer 21 and a second alignment film 22. The color filter layer 21 is arranged below the second base 20. The color filter layer 21 includes color filters having colors corresponding to the subpixels SPR, SPG and SPB. The second alignment film 22 covers the color filter layer 21. The color filter layer 21 may be arranged on the first substrate SUB1.

The second substrate SUB1 and the second substrate SUB2 are attached to each other via a sealant SL. The liquid crystal layer LC is sealed in a space enclosed with the first alignment film 13, the second alignment film 22 and the sealant SL.

The detection electrodes RX are arranged on the second base 20. The connection holes H penetrate the second base 20, the color filter layer 21, the second alignment film 22, the sealant SL, the first alignment film 13, the second insulating layer 12 and the first insulating layer 11. The connection holes H may further penetrate the pads P. For example, the connection holes H taper down toward the pads P as illustrated in the drawing, but the connection holes H are not limited to this example. A conductive connection member C is arranged in the interior of each connection hole H. Each detection electrode RX is electrically connected to the pad P via the connecting member C.

The pixel electrodes PE and the common electrodes CE can be formed of a transparent conductive material such as indium tin oxide (ITO), for example. The detection electrodes RX, the pads P and the lead lines L1 can be formed of a transparent conductive material such as ITO or a metal material. In the case of using a metal material for the detection electrodes RX, for example, an electrode pattern of single-layered or multi-layered metal wiring lines arranged in a mesh-like manner or wave-like manner can be used as the detection electrodes RX.

The cross-section structure shown in FIG. 3 is merely an example and various other structures can be applied to the display panel PNL. For example, the common electrodes CE may be arranged between the pixel electrodes PE and the liquid crystal layer LC, may be arranged on the same layer together with the pixel electrodes PE, or may be arranged on the second substrate SUB2. Further, the first alignment film 13, the color filter layer 21 or the second alignment film 22 may not be arranged in the locations of the connection holes H.

In the above-described structure, a first capacitance is formed between the detection electrodes RX and the common electrodes CE. Further, if an object such as a user's finger approaches the display area DA, a second capacitance is formed between the object and the detection electrodes RX. The detection driver R2 supplies drive signals for object detection to the common electrodes CE. At this time, detection signals are output from the detection electrodes RX to the detection driver R2 via the first capacitance. The detection signals vary depending on the presence or absence of the second capacitance or the magnitude of the second capacitance. Therefore, the detection driver R2 can detect the presence or absence of an object approaching the display area DA or the location of an object in the display area DA based on the detection signals.

The detection method described above is called a mutual-capacitive detection method. The object detection method is not limited to a mutual-capacitive detection method and may be a self-capacitive detection method. In a self-capacitive detection method, drive signals are supplied to the detection electrodes RX and detection signals are read from the detection electrodes RX, and the presence or absence of an object approaching the display area DA or the location of an object in the display area DA can be detected based on these detection signals.

Next, the structures of the peripheral circuits (the scanning line drivers GD1 and GD2, the signal line driver SD, etc.) arranged in the peripheral area SA will be described.

Figure 4:
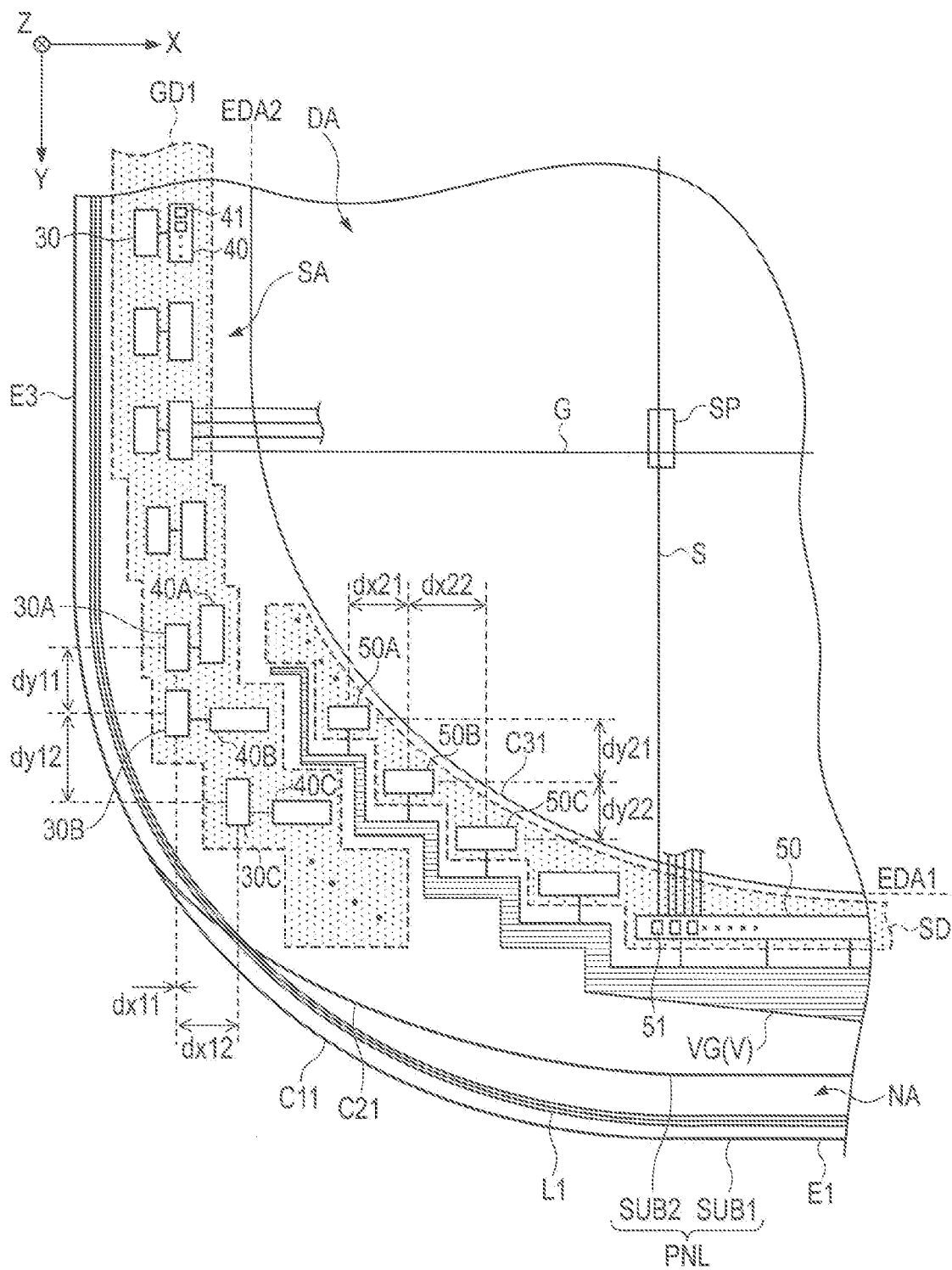
FIG. 4 is a schematic plan view of an example of the structures of peripheral circuits near a corner of a display area.

FIG. 4 is a schematic plan view of an example of the structures of the peripheral circuits near the corners C11, C21 and C31. The scanning driver GD1 includes a plurality of shift register units 30 and a plurality of buffer units 40, each of which is connected to each of the shift register units 30 and is also connected to at least one scanning line G. The shift register units 30 constitute a shift register which controls the timings for sequentially supplying scanning signals to the scanning lines G. Each buffer unit 40 includes at least one buffer circuit 41. Each buffer circuit 41 supplies a scanning signal (scanning voltage) to the scanning line G under the control of the shift register unit 30.

The first substrate SUB1 includes a video line group VG including a plurality of video lines V in the peripheral area. The video line group VG is arranged along the signal line driver SD. The video line group VG is curved along the corner C31 of the display area DA. The video lines V constituting the video line group VG are electrically connected to the display driver R1 via the connection terminal T and the wiring board F. In the example shown in FIG. 4, the signal line driver SD is arranged between the video line group VG and the display area DA. Further, in an area in which the signal line driver SD is arranged between the scanning line driver GD1 and the display area DA, the video line group VG extends between the scanning line driver GD1 and the signal line driver SD.

The signal line driver SD includes a plurality of selector units 50. Each selector unit 50 includes at least one selector circuit 51 (selector switch). The selector circuit 51 is connected to N video lines V and M signal lines S, where M is greater than N (M>N). For example, N is two and M is six (N=2 and M=6). The selector circuit 51 switches the signal lines S to be connected to the video lines V in a time sharing manner. Accordingly, video signals can be supplied to the signal lines S by using the video lines V fewer than the signal lines S arranged in the display area DA.

The lead lines L1 connecting the detection electrodes RX to the connection terminal T are arranged along the edges of the first substrate SUB1. That is, the scanning line driver GD1, the signal line driver SD and the video line group VG are located between the lead lines L1 and the display area DA. The lead lines L1 are curved in an arc shape similarly to the corner C11 near the corner C11. The distance between the lead lines L1 and the edges of the first substrate SUB1 is entirely constant in the example shown in FIG. 4 but may vary from one portion to another. For example, the distance between the lead lines L1 and the edges of the first substrate SUB1 may gradually increase toward the first edge E1 near the corner C11.

The scanning line driver GD1 and the signal line driver SD are curved along the corner C31 near the corner C31 of the display area DA. Therefore, part of the signal line driver SD near the corner C31 is located on the second edge E2 side (on the upper side in the drawing) from an outer edge EDA1 of the display area DA which is closest to the first edge E1. Further, part of the scanning line driver GD1 near the corner C31 is located on the fourth edge E4 side (on the right side in the drawing) from an outer edge EDA2 of the display area DA which is closest to the third edge E3.

The number of the selector circuits 51 included in each selector unit 50 varies such that, as the selector unit 50 is closer to the end of the signal line driver SD, the selector unit 50 includes a smaller number of selector circuits 51. Accordingly, the width of each selector unit 50 in the first direction X varies such that, as the selector unit 50 is closer to the end of the signal line driver SD, the selector unit 50 becomes narrower in the first direction X.

In the example shown in FIG. 4, the video line group VG has a stepped area in which a portion extending in the first direction X and a portion extending in the second direction Y are alternately repeated, and each of the selector units 50 is arranged with respect to each of the steps of the stepped area. Some of the selector units 50 may be arranged with respect to one of the steps. Further, at least part of the video line group VG may extend in a direction crossing the first direction X and the second direction Y.

Here, as one example, shift register units 30A, 30B and 30C and buffer units 40A, 40B and 40C connected thereto will be noted among the shift register units 30 and the buffer units 40. The shift register unit 30A and the shift register unit 30B are adjacent to each other, and the shift register unit 30B and the shift register unit 30C are adjacent to each other. Further, the buffer unit 40A and the buffer unit 40B are adjacent to each other, and the buffer unit 40B and the buffer unit 40C are adjacent to each other.

The distance between the shift register unit 30A and the shift register unit 30B in the first direction X is defined as dx11, the distance between the shift register unit 30B and the shift register unit 30C in the first direction X is defined as dx12, the distance between the shift register unit 30A and the shift register unit 30B in the second direction Y is defined as dy11, and the distance between the shift register unit 30B and the shift register unit 30C in the second direction Y is defined as dy12. In this case, the distance dx11 and the distance dx12 differ from each other in the example shown in FIG. 4. More specifically, the distance dx11 is less than the distance dx12 (dx11<dx12), and since the shift register units 30A and 30B are not misaligned with each other in the first direction X, the distance dx11 is zero. Further, the distance dy11 and the distance dy12 differ from each other in the example shown in FIG. 4. More specifically, the distance dy11 is less than the distance dy12 (dy11<dy12). As other examples, the shift register units 30A, 30B and 30C may be arranged in such a manner as to satisfy dx11>dx12 or may be arranged in such a manner as to satisfy dy11≥dy12.

In the example shown in FIG. 4, similarly to the distances dx11 and dx12, the distance between the buffer unit 40A and the buffer unit 40B in the first direction X and the distance between the buffer unit 40B and the buffer unit 40C in the first direction X differ from each other. Further, similarly to the distances dy11 and dy12, the distance between the buffer unit 40A and the buffer unit 40B in the second direction Y and the distance between the buffer unit 40B and the buffer unit 40C in the second direction Y differ from each other.

Further, as one example, selector units 50A, 50B and 50C will be noted among the selector units 50. The selector unit 50A and the selector unit 50B are adjacent to each other, and the selector unit 50B and the selector unit 50C are adjacent to each other. The selector units 50A, 50B and 50C are not aligned with each other in the first direction X and the second direction Y.

The distance between the selector unit 50A and the selector unit 50B in the first direction X is defined as dx21, the distance between the selector unit 50B and the selector unit 50C in the first direction X is defined as dx22, the distance between the selector unit 50A and the selector unit 50B in the second direction Y is defined as dy21, and the distance between the selector unit 50B and the selector unit 50C in the second direction Y is defined as dy22. In this case, the distance dx21 and the distance dx22 differ from each other in the example shown in FIG. 4. More specifically, the distance dx21 is less than the distance dx22 (dx21<dx22). Further, the distance dy21 and the distance dy22 are substantially equal to each other in the example shown in FIG. 4. As other examples, the selector units 50A, 50B and 50C may be arranged in such a manner as to satisfy dx21≥dx22 or may be arranged such that the distance dy21 and the distance dy22 differ from each other.

In this way, the scan line driver GD1 can be curved in an arc shape along the corner C31 by adjusting the distances between the shift register units 30 and the distances of the buffer units 40 in the respective directions X and Y near the corner C31. Similarly, the signal line driver SD can be curved in an arc shape along the corner C31 by adjusting the distances of the selector units 50 in the respective directions X and Y near the corner C31.

In the above description, the distance (dx11, dx12, dx21, dx22, etc.) between two adjacent units in the first direction X corresponds to the distance between the centers of the units in the first direction X. Further, the distance (dy11, dy12, dy21, dy22, etc.) between two adjacent units in the second direction Y corresponds to the distance between the centers of the units in the second direction Y.

Each shift register unit 30 includes a plurality of elements as will be described later, and the elements in the shift register units 30 are arranged in substantially equal manners. Further, each buffer unit 40 includes the plurality of buffer circuits 41, and the buffer circuits 41 in the buffer units 40 are arranged in arbitrary directions.

In FIG. 4, the shift register unit 30 is represented as a rectangle vertically elongated in the second direction Y. This shows that the elements constituting the shift register unit 30 are arranged in the second direction Y. Further, the buffer unit 40 is represented as a rectangle vertically elongated in the second direction Y on the upper side of the drawing and is represented as a rectangle horizontally elongated in the first direction X on the lower side of the drawing. This shows that the buffer circuits 41 are arranged in the second direction Y in the vertically long rectangle and the buffer circuits 41 are arranged in the first direction X in the horizontally long rectangle.

Near the corner C31 of the display area DA, the width of the peripheral area SA in the first direction X increases from the upper side to the lower side of the drawing. Further, in accordance with the width of the peripheral area SA, the buffer unit 40 transitions from the vertically long rectangle to the horizontally long rectangle. That is, the width of the peripheral area SA in the first direction X in the buffer unit 40A is not large enough to arrange the buffer circuits 41 in the first direction X, but the width of the peripheral area SA in the first direction X in the buffer unit 40B is large enough to arrange the buffer circuits 41 in the first direction X.

Although the width of the peripheral area SA in the first direction X is large in areas in which the buffer units 40B and 40C are formed, since the selector units 50A and 50B need to be formed side by side in the first direction X, the distance between two adjacent units in the first direction X and the distance between two adjacent units in the second direction Y, and the number of the video lines V to be arranged, etc., need to be taken into consideration.

Further, on the lower side of the drawing, the width of the peripheral area SA increases in the first direction X, but the width of the peripheral area SA decreases in the second direction Y and becomes limited to a certain width. Therefore, the positional relationship between the shift register units 30 and the buffer units 40 will be determined in consideration of the area in which the selector units 50 are formed.

The structure of the scanning line driver GD1 near the corner C33 of the display area DA shown in FIG. 1 is the same as the structure of the scanning line driver GD1 near the corner C31. Further, the structures of the scanning line driver GD2, the signal line driver SD, the video line group VG and the lead lines L1 near the corner C32 of the display area DA are the same as structures thereof near the corner C31. Still further, the structure of the scanning line driver GD2 near the corner C34 of the display area DA is the same as the structure of the scanning line driver GD1 near the corner C33. The structure of the peripheral area SA near the corners C31 to C34 is not limited to the illustrated example and can be appropriately modified in consideration of the layouts of circuits and wiring lines to be arranged.

FIG. 5 is a diagram showing a specific example of the equivalent circuit applicable to the scanning line driver GD1. Here, the shift register unit 30A, the buffer unit 40A, the shift register unit 30B and the buffer unit 40B will be noted among the shift register units 30 and the buffer units 40.

The shift register unit 30A includes logic circuits 31a, 32a and 33a, a clock supply switch 34a and a constant voltage supply switch 35a. The buffer unit 40A includes four buffer circuits 41. The buffer circuits 41 are connected to scanning lines Ga1 to Ga4, respectively. Each buffer circuit 41 includes a gate pulse supply switch 42a and a gate low voltage supply switch 43a. The number of buffer circuits 41 included in the buffer unit 40A is not limited to four.

The clock supply switch 34a and the gate pulse supply switch 42a are formed of an n-type thin film transistor (TFT) and a p-type TFT. The constant voltage supply switch 35a and the gate low voltage supply switch 43a are formed of an n-type TFT.

The shift register unit 30B includes logic circuits 31b, 32b and 33b, a clock supply switch 34b and a constant voltage supply switch 35b. Since the buffer unit 40B has the same structure as that of the buffer unit 40A, a circuit structure thereof is not illustrated. In the example shown in FIG. 5, the buffer unit 40B is connected to scanning lines Gb1 to Gb4. The clock supply switch 34b is formed of an n-type TFT and a p-type TFT. The constant voltage supply switch 35b is formed of a p-type TFT.

A scanning direction setting switch 60a including switches 61a and 62a is connected to the logic circuit 31a. A scanning direction setting switch 60b including switches 61b and 62b is connected to the logic circuit 31b. These scanning direction setting switches 60a and 60b determine the scanning directions of the shift register units 30, respectively. More specifically, the shift register units 30 are scanned in the order of the shift register unit 30 previous to the shift register unit 30A, the shift register unit 30A, the shift register unit 30B, and the shift register unit 30 subsequent to the shift register unit 30B. All of the switches 61a, 62a, 61b and 62b are formed of an n-type TFT and a p-type TFT.

A signal ina from the scanning direction setting switch 60a and a signal backa are input to the logic circuit 31a. The logic circuit 31a outputs a signal corresponding to the inverted logical sum of the signals ina and backa, to the logic circuit 32a, the p-type TFT of the clock supply switch 34a and the constant voltage supply switch 35a. The logic circuit 32a inverts the signal from the logic circuit 31a and outputs the inverted signal to the n-type TFT of the clock supply switch 34a. In accordance with the signal from the logic circuit 31a, one of the clock supply switch 34a and the constant voltage supply switch 35a is turned on. The clock supply switch 34a outputs a clock CKV when the clock supply switch 34a is on. On the other hand, the constant voltage supply switch 35a outputs a constant low voltage VGL when the constant voltage supply switch 35a is on. The clock CKV and the low voltage VGL are output to the buffer unit 40A as an output signal out1 and are also output to the logic circuit 31a as the signal backa. Further, the output signal out1 is inverted in the logic circuit 33a and is output to the buffer unit 40A as an output signal xout1.

In the buffer unit 40A, the output signal out1 is input to the n-type TFTs of the gate pulse supply switches 42a. The output signal xout1 is input to the p-type TFTs of the gate pulse supply switches 42 and the gate low voltage supply switches 43a. If the output signal out1 is at an L level (low voltage) and the output signal xout1 is at an H level (high voltage), the gate pulse supply switches 42a are turned off and the gate low voltage supply switches 43a are turned on. In this case, the low voltage VGL is output from the gate low voltage supply switches 43a to the scanning lines Ga1 to Ga4. The low voltage VGL turns off the switching elements SW.

On the other hand, if the output signal out1 is at an H level and the output signal xout1 is at an L level, the gate pulse supply switches 42a are turned on and the gate low voltage supply switches 43a are turned off. In this case, enable signals enb1 to enb4 are output from the gate pulse supply switches 42a to the scanning lines Ga1 to Ga4, respectively.

The output signal xout1 is output to the logic circuit 31b of the shift register unit 30B as a signal inb via the scanning direction setting switch 60b. A signal backb is also input to the logic circuit 31b. The logic circuit 31b outputs a signal corresponding to the logical sum of the inverted signals inb and backb to the logic circuit 32b, the p-type TFT of the clock supply switch 34b and the constant voltage supply switch 35b. The logic circuit 32b inverts the signal from the logic circuit 31b and outputs the inverted signal to the p-type TFT of the clock supply switch 34b. In accordance with the signal from the logic circuit 31b, one of the clock supply switch 34b and the constant voltage supply switch 35b is turned on. The clock supply switch 34b outputs the clock CKV when the clock supply switch 34b is on. On the other hand, the constant voltage supply switch 35b outputs a constant high voltage VGH when the constant voltage supply switch 35b is on. The clock CKV and the high voltage VGH are output to the buffer unit 40B as an output signal xout2 and are also output to the logic circuit 31b as the signal backb. Further, the output signal xout2 is inverted in the logic circuit 33b and is output to the buffer unit 40B as an output signal out2. The output signal out2 is also output to the scanning direction setting switch corresponding to the subsequent shift register unit 30. The buffer unit 40B is driven by the output signals out2 and xout2 in the same manner that the buffer unit 40A is driven by the output signals out1 and xout1.

The clock CKV and the enable signals enb1 to enb4, etc., are supplied from the display driver R1, for example.

Figure 6:
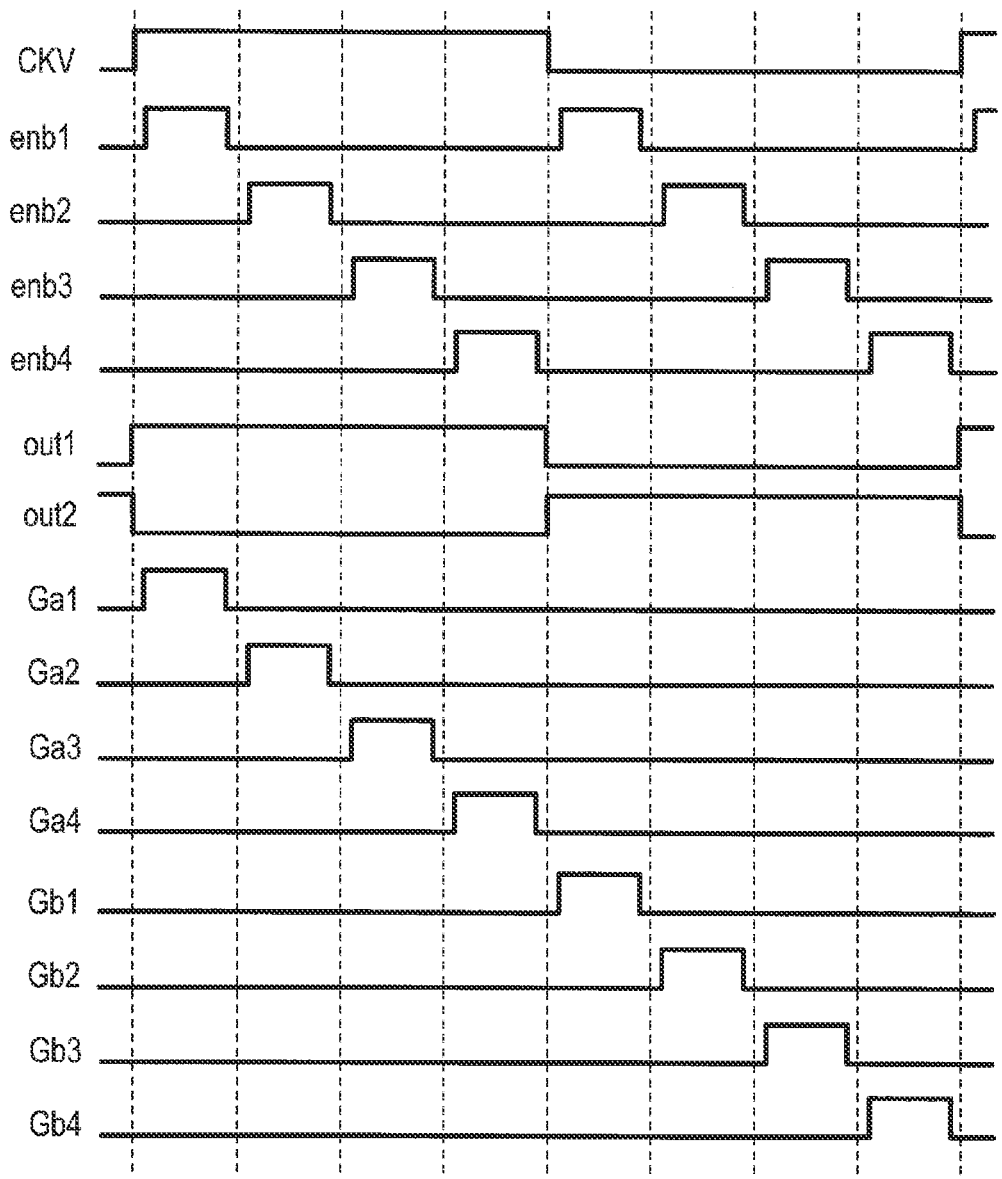
FIG. 6 is a timing chart showing an example of driving of scanning lines.

An example of the driving of the scanning lines Ga1 to Ga4 by the circuit structure shown in FIG. 5 will be described with reference to the timing chart shown in FIG. 6. If the signal ina transitions from an L level to an H level, the signal output from the logic circuit 31a is set to an L level, and the clock supply switch 34a is turned on and the constant voltage supply switch 35a is turned off. At this time, if the H-level clock CKV is supplied, the output signals out1 and xout1 are set to an H level and an L level, respectively, and the gate pulse supply switches 42a are turned on and the gate low voltage supply switches 43a are turned off. Accordingly, the enable signals enb1 to enb4 are supplied to the scanning signal lines Ga1 to Ga4. The enable signals enb1 to enb4 are four-phase clocks which divide a period in which the clock CKV is at an H level or an L level into four. That is, the enable signals enb1 to enb4 sequentially transition to an H level in the H-level period of the clock CKV as shown in FIG. 6. Accordingly, pulsed scanning signals are sequentially supplied to the scanning signal lines Ga1 to Ga4.

Subsequently, if the clock CKV transitions to an L level, the signal inb is set to an H level, and the signal output from the logic circuit 31b is set to an H level. Accordingly, the clock supply switch 34b is turned on and the constant voltage supply switch 35b is turned off, and the output signals out2 and xout2 are set to an H level and an L level, respectively. In this state, the enable signals enb1 to enb4 sequentially transition to an H level, and pulsed scanning signals are sequentially supplied to the scanning lines Gb1 to Gb4.

It is possible to supply scanning signals sequentially to the scanning lines G by applying the structure corresponding to the shift register unit 30A and the buffer unit 40A and the structure corresponding to the shift register unit 30B and the buffer unit 40B alternately to the shift register units 30 and the buffer units 40 of the scanning line driver GD1. The same structure can also be applied to the scanning line driver GD2.

Next, a specific example of the structures of the peripheral circuits near the corner C31 of the display area DA will be described with reference to a plan view shown in FIG. 7. The illustrated structures are also applicable to the peripheral circuits near the corner C32 of the display area DA. Further, the structures of the shift register units 30 and the buffer units 40 are also applicable to the peripheral circuits near the other corners C32, C33 and C34 of the display area DA.

Figure 7:
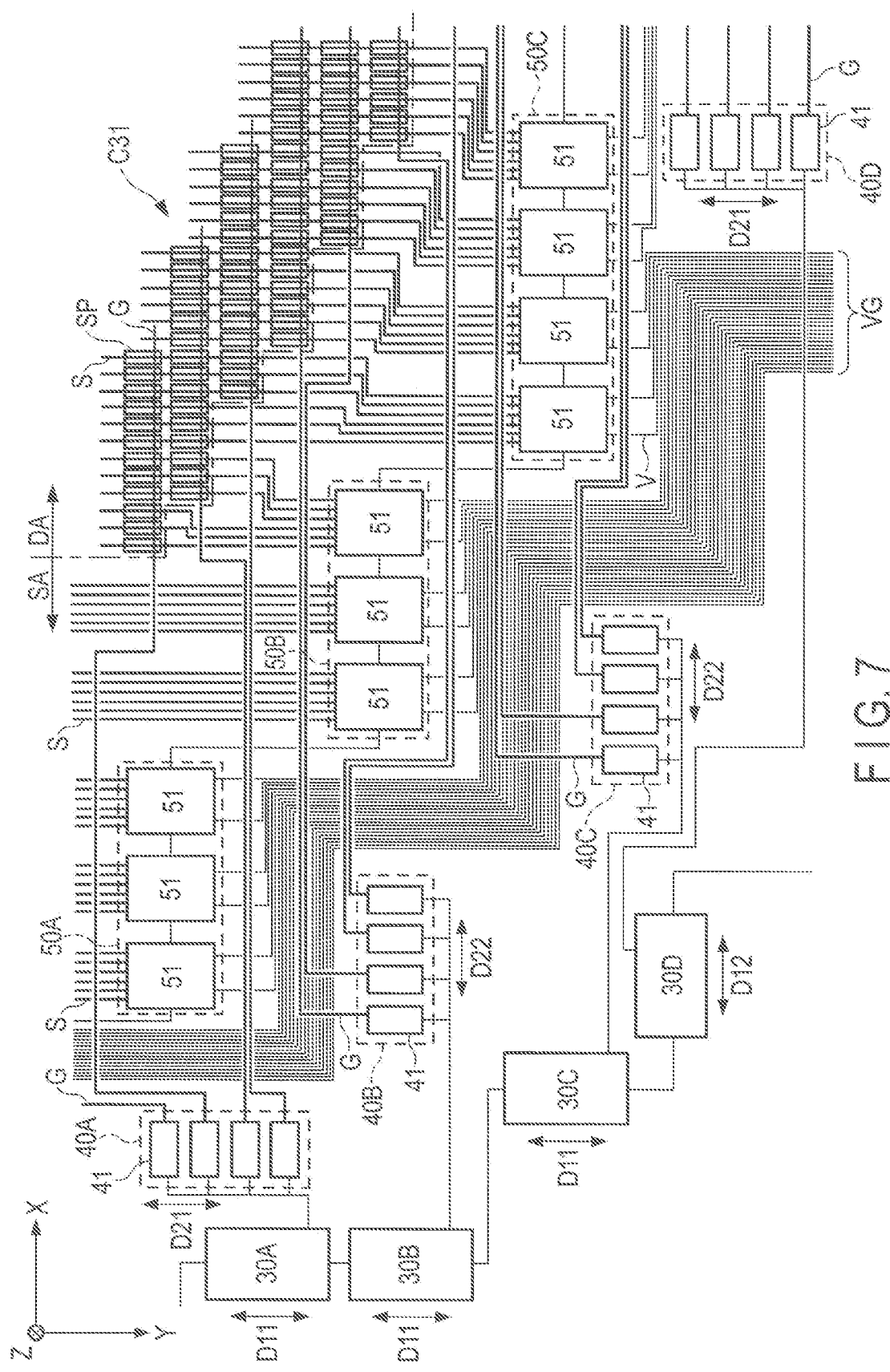
FIG. 7 is a schematic plan view of a specific example of the structures of the peripheral circuits near the corner of the display area.

The peripheral circuits shown in FIG. 7 include the shift register units 30A, 30B, 30C and 30D, the buffer units 40A, 40B, 40C and 40D, the selector units 50A, 50B and 50C, and the video line group VG. The shift register unit 30D is adjacent to the shift register unit 30C. The buffer unit 40D is connected to the shift register unit 30D.

Each of the buffer units 40A, 40B, 40C and 40D includes four buffer circuits 41. Each buffer circuit 41 is connected to one scanning line G. Each of the selector unit 50A and the selector unit 50B includes three selector circuits 51, and the selector unit 50C includes four selector circuits 51. Each selector circuit 51 is connected to two video lines V and six signal lines S. In the selector units 50A, 50B and 50C, the selector circuits 51 are arranged in the first direction X. The scanning lines G and the signal lines S extend over the display area DA. The subpixels SP in the display area DA are arranged stepwise near the corner C31, and the arc-shaped corner C31 shown in FIG. 4, etc., can be realized by adjusting the number of subpixels SP constituting each of the steps.

In the example shown in FIG. 7, an extension direction D11 of the shift register units 30A, 30B and 30C and an extension direction D12 of the shift register unit 30D differ from each other. Here, the extension direction of the shift register unit 30 corresponds to the longitudinal direction of the shift register unit 30, for example. The extension direction of the shift register unit 30 may be the direction of arrangement of elements such as TFTs included in the shift register unit 30.

Further, in the example shown in FIG. 7, an extension direction D21 of the buffer units 40A and 40D and an extension direction D22 of the buffer units 40B and 40C differ from each other. Here, the extension direction of the buffer unit 40 corresponds to the longitudinal direction of the buffer unit 40, for example. The extension direction of the buffer unit 40 may be the direction of arrangement of the buffer circuits 41 included in the buffer unit 40.

For example, the extension directions D11 and D21 are parallel to the second direction Y, and the extension directions D12 and D22 are parallel to the first direction X. In this case, the extension direction of the shift register unit 30A is the same as the extension direction of the buffer unit 40A. On the other hand, the extension direction of the shift register unit 30B differs from the extension direction of the buffer unit 40B, the extension direction of the shift register unit 30C differs from the extension direction of the buffer unit 40C, and the extension direction of the shift register unit 30D differs from the extension direction of the buffer unit 40D. The extension directions D11, D12, D21 and D22 may also be directions crossing the first direction X or the second direction Y.

The space of the peripheral area SA can be efficiently used by appropriately adjusting the extension directions of the pair of the shift register unit 30 and the buffer unit 40 to the same direction or different directions. As a result, the area of the peripheral area SA can be reduced, and the frame of the display device DSP can be narrowed.

In the example shown in FIG. 7, the buffer units 40A, 40B and 40C are arranged on the outer side of the video line group VG (on the opposite side of the video line group VG from the display area DA), but the buffer unit 40D is arranged between the video line group VG and the display area DA. The space of the peripheral area SA can be more efficiently used by adjusting the arrangement locations of the buffer units 40.

Figure 8:
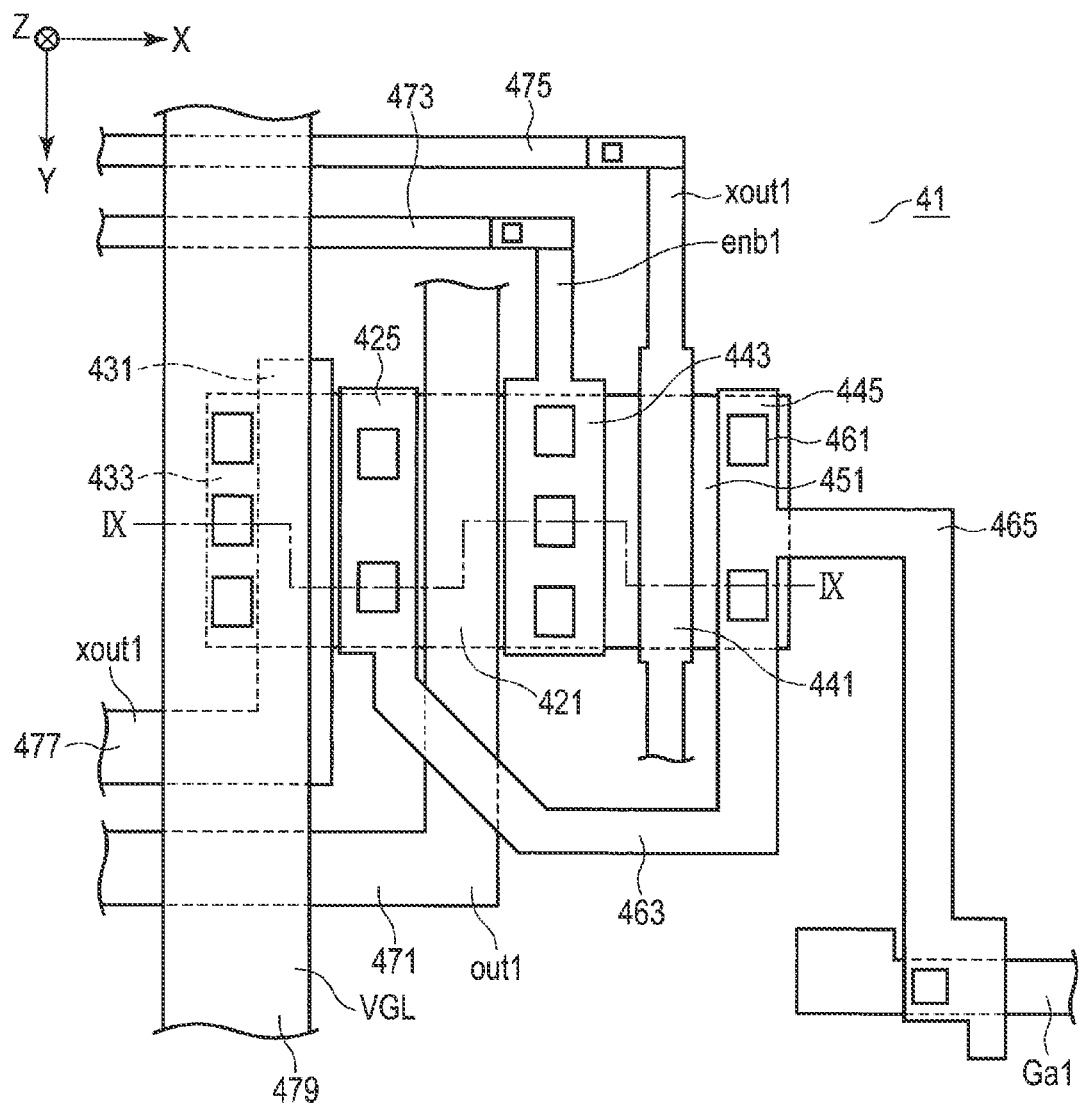
FIG. 8 is a diagram showing an example of the layout of a buffer unit.
Figure 9:
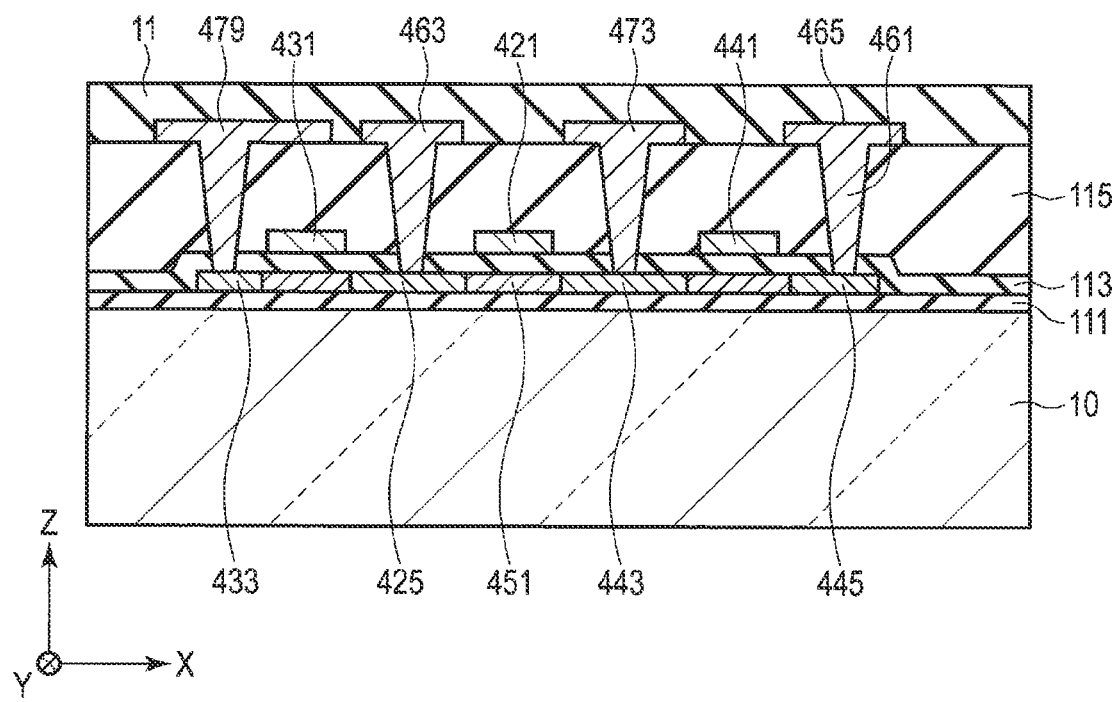
FIG. 9 is a diagram showing an example of the cross-section of a buffer circuit taken along line IX-IX of FIG. 8.

Next, the extension direction of the buffer unit 40 will be described with reference to a layout diagram shown in FIG. 8. FIG. 8 is a detailed view of the buffer circuit 41 of the buffer unit 40A shown in FIG. 5 and is a layout diagram of elements constituting the buffer circuit 41. FIG. 9 is a sectional view of the buffer circuit 41 taken along line IX-IX of FIG. 8. The illustrated structure is also applicable to the peripheral circuits near the corners C32, C33 and C34 of the display area DA. FIG. 9 shows the detailed structure of the buffer circuit 41 from the first base 10 to the first insulating layer 11 shown in the sectional view of FIG. 3.

In FIG. 8, the n-type TFT of the gate pulse supply switch 42a (hereinafter referred to as a first n-type transistor), the p-type TFT of the gate pulse supply switch 42a (hereinafter referred to as a first p-type transistor) and the gate low voltage supply switch 43a (hereinafter referred to as a second n-type transistor) are arranged side by side on a same semiconductor layer 451.

The gate of the first n-type transistor is indicated as 421, and a wiring line 471 is connected and the output signal out1 shown in FIG. 5 is supplied to the gate 421 of the first n-type transistor. To clarify wiring lines, signal names are added to the drawing. An area functioning as the drain of the first n-type transistor and the source of the first p-type transistor is indicated as 443. A wiring line 473 is connected and the enable signal enb1 shown in FIG. 5 is supplied to the area 443. An area functioning as the source of the first n-type transistor and the source of the second n-type transistor is indicated as 425. If the output signal out1 is set to an H level, the first n-type transistor is set to an on state, and the enable signal enb1 is output from the source 425 of the first n-type transistor to a wiring line 463.

The gate of the first p-type transistor is indicated as 441, and a wiring line 475 is connected and the output signal xout1 shown in FIG. 5 is supplied to the gate 441 of the first p-type transistor. The drain of the first p-type transistor is indicated as 445. If the output signal xout1 is set to an L level, the first p-type transistor is set to an on state, and the enable signal enb1 is output from the drain 445 of the first p-type transistor to a wiring line 465.

Since the output signal xout1 is the inverted output signal out1, the first n-type transistor and the first p-type transistor are concurrently set to an on state and output the enable signal enb1.

The gate of the second n-type transistor is indicated as 431, and a wiring line 477 is connected and the output signal xout1 shown in FIG. 5 is supplied to the gate 431 of the second n-type transistor. The drain of the second n-type transistor is indicated as 433. If the output signal xout 1 is set to an H level, the second n-type transistor is set to an on state, and the low voltage VGL applied via a wiring line 479 is output from the source 425 of the second n-type transistor to the wiring line 463.

As shown in the sectional view of FIG. 9 taken along line IX-IX of FIG. 8, the semiconductor layer 451 is formed on the first base 10 such as a glass substrate or a resin substrate. In the semiconductor layer 451, the drain 445 of the first p-type transistor, the area 443 functioning as the drain of the first n-type transistor and the source of the first p-type transistor, the area 425 functioning as the source of the first n-type transistor and the source of the second n-type transistor, and the drain 433 of the second n-type transistor are formed by implanting impurities, etc. An underlying layer 111 is formed between the semiconductor layer 451 and the first base 10.

An insulating film 113 is formed on the semiconductor layer 451, and the gate 441 of the first p-type transistor, the gate 421 of the first n-type transistor and the gate 431 of the second n-type transistor are formed on the insulating film 113. An insulating film 115 is formed on the gates 421, 431 and 441, and the wiring line (power supply line) 479 which applies the low voltage VGL, the wiring line 473 which supplies the enable signal enb1, the wiring line 463 which is connected to the area 425 functioning as the sources of the first and second n-type transistors, and the wiring line 465 which is connected to the drain 445 of the first p-type transistor are formed on the insulating film 115.

The output of the buffer circuit 41 is connected to the wiring line 465 via the wiring line 463, and the wiring line 465 is connected to the scanning line Ga1.

A plurality of through holes 461 are formed in the insulating film 115. The drain 445 of the first p-type transistor is electrically connected to the wiring line 465, the wiring line 473 is electrically connected to the area 443 functioning as the drain of the first n-type transistor and the source of the first p-type transistor, the area 425 functioning as the sources of the first and second n-type transistors is electrically connected to the wiring line 463, and the drain 433 of the second n-type transistor is electrically connected to the wiring line 479 which applies the low voltage VGL, respectively, via the through holes 461.

Regarding the signal flow in FIG. 8, the output signals out1 and xout1 from the shift register unit 30 located on the left side of the drawing are input to the buffer circuit 41, and the signal from the buffer circuit 41 is output to the scanning line G located on the right side of the drawing. Accordingly, the signals flow in the first direction X. Further, the shape of the buffer circuit 41 is defined by the shape of the semiconductor layer 451. The semiconductor layer 451 has a rectangular shape in such a manner as to become the same in the gate pulse supply switch 42a and the gate low voltage supply switch 43a, and the sides extending in the first direction X are longer than the sides extending in the second direction Y in the drawing.

Further, the drain 433 of the second n-type transistor, the area 425 functioning as the source of the first n-type transistor and the source of the second-n-type transistor, the area 443 functioning as the drain of the first n-type transistor and the source of the first p-type transistor, and the drain 445 of the first p-type transistor are arranged in the first direction X along the long sides of the rectangular semiconductor layer 451.

The buffer unit 40 shown in FIG. 5 includes the plurality of buffer circuits 41 shown in FIG. 8. In the structure of the buffer circuit 41 shown in FIG. 8, if the buffer circuits 41 are arranged side by side, two adjacent buffer circuits 41 are arranged such that the long sides of the semiconductor layers 451 are opposed to each other. Accordingly, in FIG. 8, the buffer circuits 41 are arranged in the second direction Y, and the extension direction of the buffer unit 40 will be the second direction Y.

As described above, the buffer units 40 have two extension directions, i.e., the extension direction of a rectangle elongated in the second direction Y and the extension direction of a rectangle elongated in the first direction X in accordance with the width of the peripheral area SA near the corners C31, C32, C33 and C34 of the display area DA. In the buffer unit 40 represented as a rectangle elongated in the second direction Y, the buffer circuits 41 are formed in the second direction Y, and the buffer unit 40 extends in the second direction Y. In the buffer unit 40 represented as a rectangle elongated in the first direction X, the buffer circuits 41 are formed in the first direction X, and the buffer unit 40 extends in the first direction X.

Figure 10:
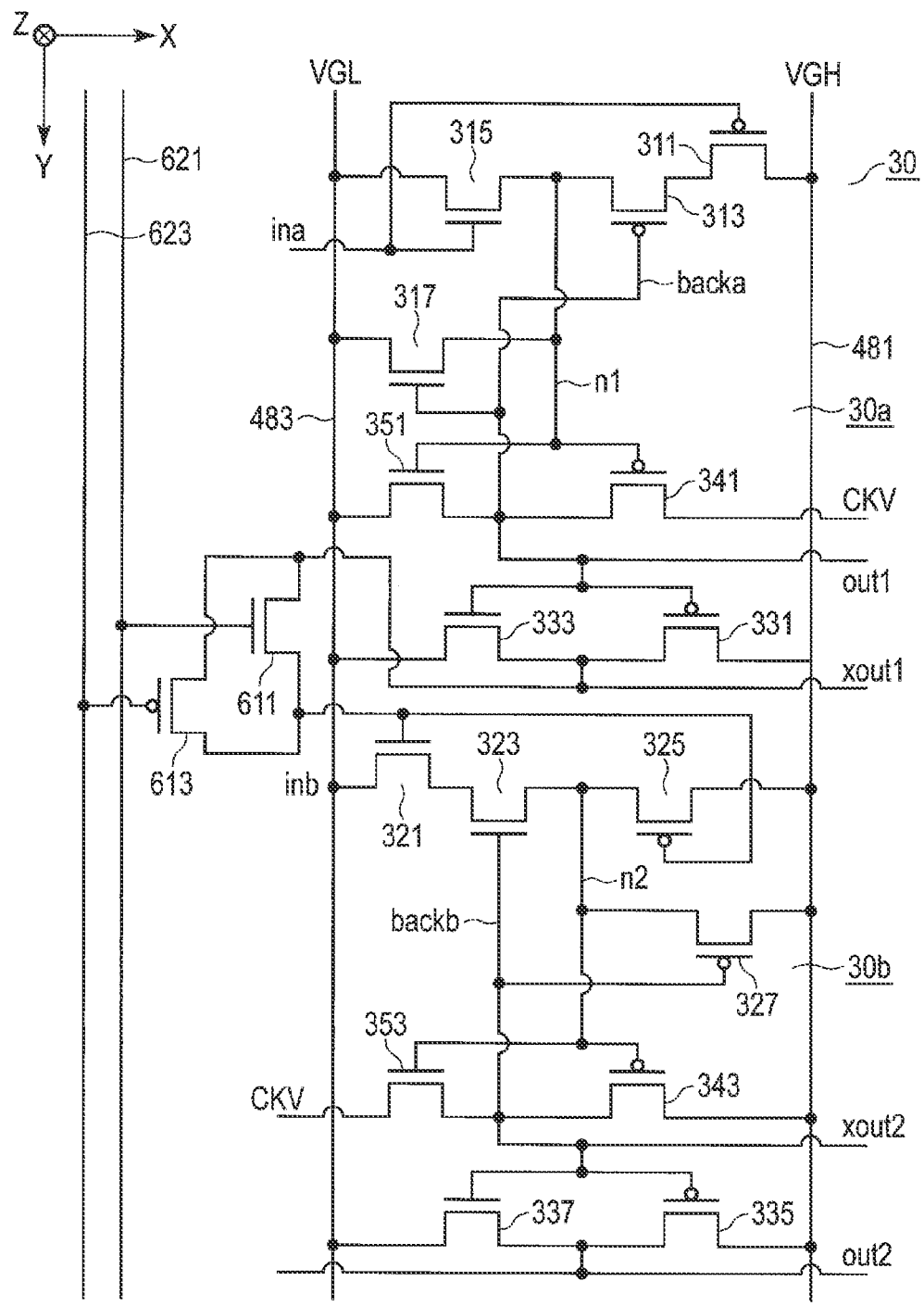
FIG. 10 is a diagram showing an example of a detailed circuit of a shift register unit.

Next, the detailed circuits of the shift register units 30A and 30B are shown in FIG. 10. Although FIG. 10 is a circuit diagram, the arrangement and positional relationship of the circuit symbols of the transistors indicate the arrangement and positional relationship of the transistors formed on the first base 10.

In FIG. 10, p-type transistors 311 and 313 and n-type transistors 315 and 317 constitute the logic circuit (NOR) 31a shown in FIG. 5. The signal ina is input to the gate of the p-type transistor 311 and the gate of the n-type transistor 315. The outputs of the p-type transistor 311 and the n-type transistor 315 are connected to a node n1. The node n1 is connected to the gate of the p-type transistor 341 and the gate of the n-type transistor 351 (the constant voltage supply switch 35a). The logic circuit (inverter) 32a, and the n-type transistor of the clock supply switch (transfer gate) 34a shown in FIG. 5 are omitted in FIG. 10. Therefore, the clock supply switch 34a is formed of the p-type transistor 341.

If the node n1 is at an L level, the p-type transistor 341 is set to an on state, and the clock CKV is output as the output signal out1 and the signal backa. If the node n1 is at an H level, the n-type transistor 351 is set to an on state, and the low voltage VGL is output as the output signal out1 and the signal backa. If the signal backa is at an L level, the p-type transistor 313 is set to an on state, and if the signal backa is at an H level, the n-type transistor 317 is set to an on state. If the p-type transistors 313 and 311 are set to an on state, the high voltage VGH is applied to the node n1. On the other hand, if the n-type transistor 317 is set to an on state, the low voltage VGL is applied to the node n1.

An n-type transistor 331 and a p-type transistor 333 constitute the logic circuit (inverter) 33a shown in FIG. 5. The signal output from the logic circuit 33a is inverted and output as the output signal xout1. The output signal xout1 is output to the logic circuit (NOR) 31b of the shift register unit 30B as the signal inb via the n-type transistor 611 and the p-type transistor 613 which constitute the switch 61b. If a scanning direction control line 612 is at an H level and a scanning direction control line 623 is at an L level, a signal shifts from the shift register unit 30a to the shift register unit 30b. If the scanning direction control line 621 is at an L level and the scanning direction control line 623 is at an H level, a signal shifts from the shift register unit 30b to the shift register unit 30a.

The logic circuit 31b is formed of n-type transistors 321 and 323 and p-type transistors 325 and 327. The signal inb is input to the gate of the n-type transistor 321 and the gate of the p-type transistor 325. The outputs of the n-type transistor 323 and the p-type of the transistor 325 are connected to a node n2. The node n2 is connected to the gate of the p-type transistor 343 (the constant voltage supply switch 35b) and the gate of the n-type transistor 353. The logic circuit (inverter) 32b, and the p-type transistor of the clock supply switch (transfer gate) 34b shown in FIG. 5 are omitted in FIG. 10. Therefore, the clock supply switch 34b is formed of the n-type transistor 353.

If the node n2 is at an H level, the n-type transistor 353 is set to an on state, and the clock CKV is output as the output signal xout2 and the signal backb. If the node n2 is at an L level, the p-type transistor 343 is set to an on state, and the high voltage VGH is output as the output signal xout2 and the signal backb. If the signal backb is at an H level, the n-type transistor 323 is set to an on state, and if the signal backb is at an L level, the p-type transistor 327 is set to an on state. If the n-type transistors 323 and 321 are set to an on state, the low voltage VGL is applied to the note n2. On the other hand, if the p-type transistor 327 is set to an on state, the high voltage VGH is applied to the node n2.

An n-type transistor 337 and a p-type transistor 335 constitute the logic circuit (inverter) 33b shown in FIG. 5. The signal is inverted in the logic circuit 33b and is output as the output signal out2.

Figure 11:
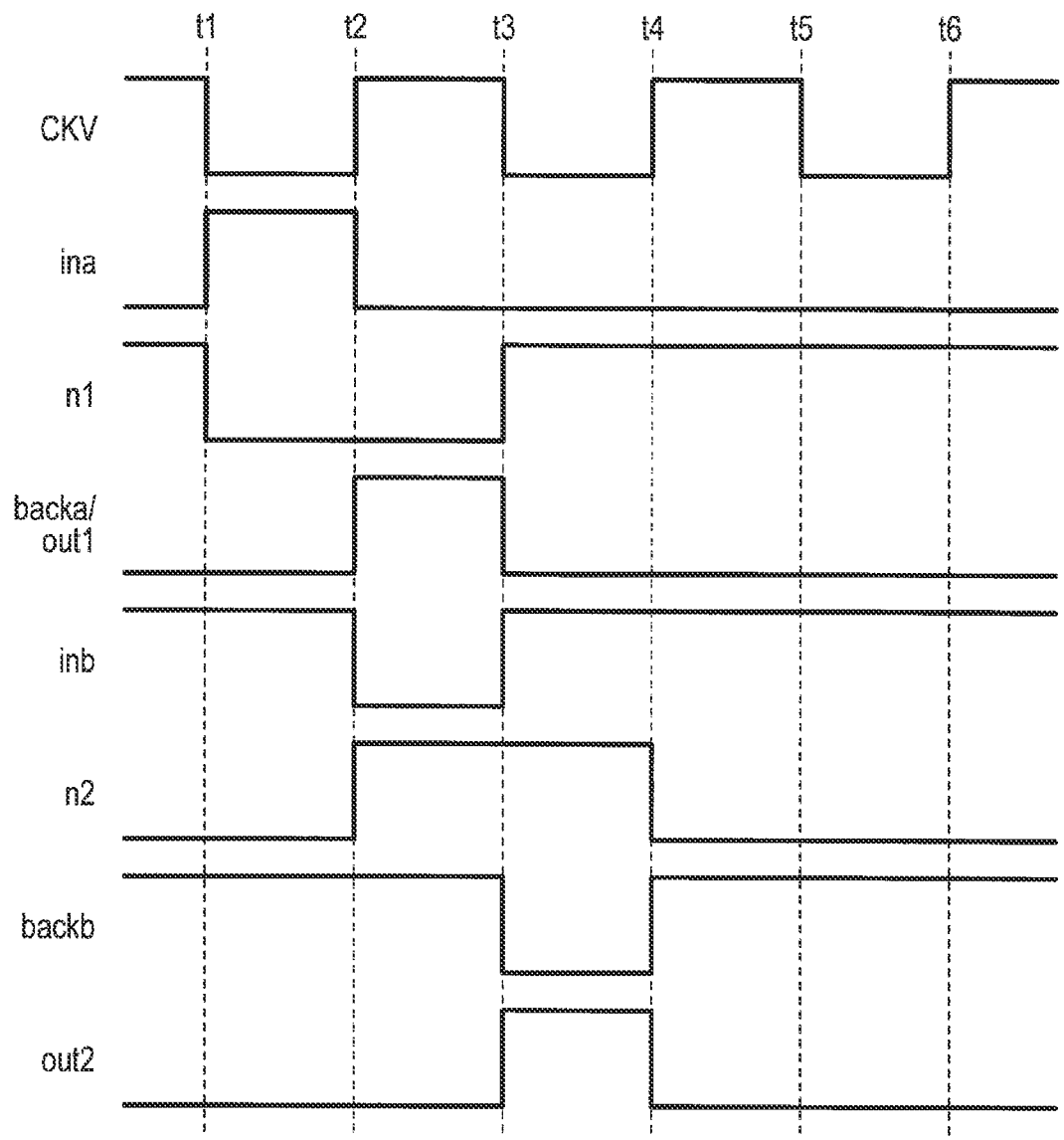
FIG. 11 is a timing chart showing an example of the operation of the circuit of FIG. 10.

Next, the operations of the circuits shown in FIG. 10 will be described with reference to a timing chart shown in FIG. 11. At time t1, the signal ina from the shift register unit 30 previous to the shift register unit 30a shifts from an L level to an H level. If the signal ina is at an L level, the n-type transistor 315 is set to an on state, and the node n1 is set to an L level. When the node n1 is set to an L level, the p-type transistor 341 is set to an on state, but from the time t1 to time t2, the clock CKV is at an L level, and therefore the output signal out1 and the signal backa are at an L level.

Subsequently, when the time t2 comes, the clock CKV shifts from an L level to an H level, and from the time t2 to time t3, the output signal out1 and the signal backa are set to an H level. When the signal backa is at an H level, the n-type transistor 351 is set to an on state, and therefore the node n1 is set to an L level and the p-type transistor 341 is maintained in an on state. Further, from the time t2 to the time t3, the signal xout1 corresponding to the signal inverted in the inverter 33a is at an L level, and the signal inb to be input to the shift register unit 30a is at an L level.

When the time t3 comes, the clock CKV shifts from an L level to an H level and the signal backa is set to an L level, and therefore the n-type transistor 317 is set to an off state and the p-type transistor 313 is set to an on state. At the time t3, the signal ina is at an L level, and therefore the p-type transistor 311 is set to an on state. Consequently, the node n1 is set to an H level by the high voltage VGH, and after the time t3, the node n1 is maintained at an H level.

As described above, the arrangement and positional relationship of the circuit symbols of the transistors indicate the arrangement and positional relationship of the transistors on the first base 10 in FIG. 10. In FIG. 10, the main transistors constituting the shift register unit 30 are formed in an area sandwiched between a wiring line 481 which applies the high voltage VGH and a wiring line 483 which applies the low voltage VGL. That is, the logic circuits 31*a*, 33*a*, 31*b* and 33*b*, the clock supply switches 34*a* and 34*b*, and the constant voltage supply switches 35*a* and 35*b* which constitute the shift register unit 30 are formed in the second direction Y in which the wiring lines 481 and 483 extend. Therefore, the extension direction of the shift register units 30*a* and 30*b* is the second direction Y in which the wiring lines 481 and 483 extend.

The high voltage VGH and the low voltage VGL are appropriately set such that the low voltage VGL becomes lower than the high voltage VGH. The high voltage VGH and the low voltage VGL are power supply voltages of the logic circuits 31*a*, 33*a*, 31*b* and 33*b*, the clock supply switches 34*a* and 34*b* and the constant voltage supply switches 35*a* and 35*b*, and are also voltages which perform on-off control of the elements.

As described above, the shift register unit 30 has two extension directions, i.e., the extension direction of a rectangle elongated in the second direction and the extension direction of a rectangle elongated in the first direction in accordance with the width of the peripheral area SA near the corners C31, C32, C33 and C34 of the display area DA. In the shift register unit 30 represented as a rectangle elongated in the second direction Y, the wiring lines which apply the high voltage VGH and the low voltage VGL are formed in the second direction Y, and the shift register unit 30 extends in the second direction Y. In the shift register unit 30 represented as a rectangle elongated in the first direction X, the wiring lines which apply the high voltage VGH and the low voltage VGL are formed in the first direction X, and the shift register unit 30 extends in the first direction X.

If the buffer units 40 and the shift register units 30 have a plurality of extension directions as described above, the arrangement locations of the buffer units 40 and the shift register units 30 can be adjusted, and consequently the space of the peripheral area SA can be used more efficiently.

Further, as described above with reference to FIG. 4, if the distance between the adjacent shift register units 30, the distance between the adjacent buffer units 40 and the distance between the adjacent selector units 50 are not fixed but are at least partially variable, the overall shapes of the scanning line drivers GD1 and GD2 and the signal line driver SD can be adjusted. Accordingly, even if the display area DA has a non-rectangular shape such as the display area DA having the arc-shaped corners C31 to C34 as described in the present embodiment, the scanning line drivers GD1 and GD2 and the signal line driver SD can be optimally shaped, and the area of the peripheral area SA can be reduced.

Still further, in the case of controlling a plurality of buffer units 40 by a single shift register unit 30 as described with reference to FIGS. 5 and 6, the number of shift register units 30 included in the scanning line drivers GD1 and GD2 can be reduced. As a result, the area of the peripheral area SA can be further reduced.

A plurality of elements identical or similar to each other such as the shift register units 30, the buffer units 40, the selector units 50, the scanning lines G and the signal lines S described in the present embodiment can be differentiated from each other by appropriately adding words such as "the first", "the second", "the third", . . . , "the nth".

Further, it is normal for a person of ordinary skill in the art to conceive various modifications of the present invention within the scope of the technical concept of the present invention, and such modifications will fall within the scope of the present invention. For example, a person of ordinary skill in the art may make an addition, a deletion or a design change of a structural element, or make an addition, an omission or a condition change of a manufacturing process to the above-described embodiment, but such modifications will also come within the scope of the present invention as long as they fall within the scope and spirit of the present invention.

Still further, when it comes to advantages other than those described in the embodiment, advantages obvious from the description of the present invention and advantages appropriately conceivable by a person having ordinary skill in the art are considered as advantages achievable from the present invention as a matter of course.

What is claimed is:

1. A display device comprising:
a first pixel row in a display area;
a second pixel row next to the first pixel row in the display area;
a first scanning line of the first pixel row;
a second scanning line of the second pixel row;
a scanning line driver including a first transistor connected to the first scanning line, and a second transistor connected to the second scanning line;
a first video signal line;
a second video signal line;
a first selector circuit connected to the first video signal line; and
a second selector circuit connected to the second video signal line,
wherein
the first scanning line extends between the first selector circuit and the second selector circuit,
the second scanning line extends between the first selector circuit and the second selector circuit, and
a first gap between the first scanning line and the second scanning line in a region between the first selector circuit and the second selector circuit is smaller than a second gap between the first scanning line and the second scanning line in the display area.

2. The display device of claim 1, wherein
the first video signal line and the second video signal line are arrayed in a first direction in the display area,
the first scanning line and the second scanning line are arrayed in a second direction intersecting the first direction in the display area, and
the second selector circuit is displaced from the first selector circuit in the first direction and the second direction.

3. The display device of claim 2, wherein
the first scanning line and the second scanning line extend parallel to each other in the region between the first selector circuit and the second selector circuit.

4. The display device of claim 2, wherein
the first video signal line does not cross either of the first scanning line and the second scanning line, and
the second video signal line crosses each of the first scanning line and the second scanning line.

5. The display device of claim 2, wherein
the first transistor and the second transistor are located outside of the display area,
the first transistor is located on an extension line of the second pixel row in the first direction, and
the second transistor is displaced from the extension line in the second direction.

6. The display device of claim 2, wherein
the first selector circuit is connected to the second selector circuit by a connection line, and
the first scanning line and the second scanning line cross the connection line at the region between the first selector circuit and the second selector circuit.

7. The display device of claim 2, wherein
the scanning line driver includes a first buffer circuit and a second buffer circuit,
the first buffer circuit includes the first transistor,
the second buffer circuit includes the second transistor, and
the first buffer circuit and the second buffer circuit are adjacent to each other in the second direction and are not displaced in the first direction.

8. The display device of claim 2, wherein
the scanning line driver includes a first buffer circuit and a second buffer circuit,
the first buffer circuit includes the first transistor,
the second buffer circuit includes the second transistor, and
the first buffer circuit and the second buffer circuit are adjacent to each other in the first direction and are not displaced in the second direction.

* * * * *